United States Patent [19]
Hara

[11] Patent Number: 5,125,472
[45] Date of Patent: Jun. 30, 1992

[54] APPARATUS FOR CONTROLLING ATTITUDE OF PASSENGER

[75] Inventor: Toshihiro Hara, Hiroshima, Japan

[73] Assignee: Mazda Motor Corporation, Hiroshima, Japan

[21] Appl. No.: 631,660

[22] Filed: Dec. 20, 1990

[30] Foreign Application Priority Data

Dec. 25, 1989 [JP] Japan .................................. 1-337084
Nov. 28, 1990 [JP] Japan .................................. 2-322497

[51] Int. Cl.⁵ .......................... B60R 21/00; B60N 2/42
[52] U.S. Cl. ...................... 180/271; 280/731; 280/732; 280/748; 297/216; 297/284 H
[58] Field of Search ............ 180/271, 274, 282; 280/730, 734, 728, 801, 731, 732, 748; 297/216, 284 H

[56] References Cited

U.S. PATENT DOCUMENTS

| | | | |
|---|---|---|---|
| 3,791,667 | 2/1974 | Haviland | 280/730 |
| 3,848,695 | 11/1974 | Lacaze, Jr. | 180/103 |
| 3,981,518 | 9/1976 | Pulling | 180/274 |
| 3,981,520 | 9/1976 | Pulling | 280/730 |
| 4,154,472 | 5/1979 | Bryll | 296/68.1 |
| 4,712,834 | 12/1987 | Warrick | 297/216 |
| 4,884,652 | 12/1989 | Vollmer | 180/274 |
| 4,995,639 | 2/1991 | Breed | 280/735 |

FOREIGN PATENT DOCUMENTS

| | | | |
|---|---|---|---|
| 36-294611 | 3/1961 | Japan . | |
| 0048404 | 4/1984 | Japan | 297/284 |
| 0164347 | 7/1991 | Japan | 280/748 |

Primary Examiner—Charles A. Marmor
Assistant Examiner—Paul Dickson
Attorney, Agent, or Firm—Price, Heneveld, Cooper, DeWitt & Litton

[57] ABSTRACT

A passenger attitude control apparatus for use in combination with an air bag disposed to restrain the upper body of a passenger at the moment of a collision. Under normal conditions, a passenger is seated on a cushion supported by a cushion spring having one end fixed to the back side of a seat and with the other end fixed to a rotatable shaft having an attached end plate which is prevented from turning by a locking member. At substantially the same time as the operation of the air bag, upon the occurrence of a collision, the locking member releases the end plate enabling the shaft to turn, causing the passenger and seat to descend. The passenger is distanced from the front portion of the compartment to prevent the passenger from sustaining injury.

19 Claims, 7 Drawing Sheets

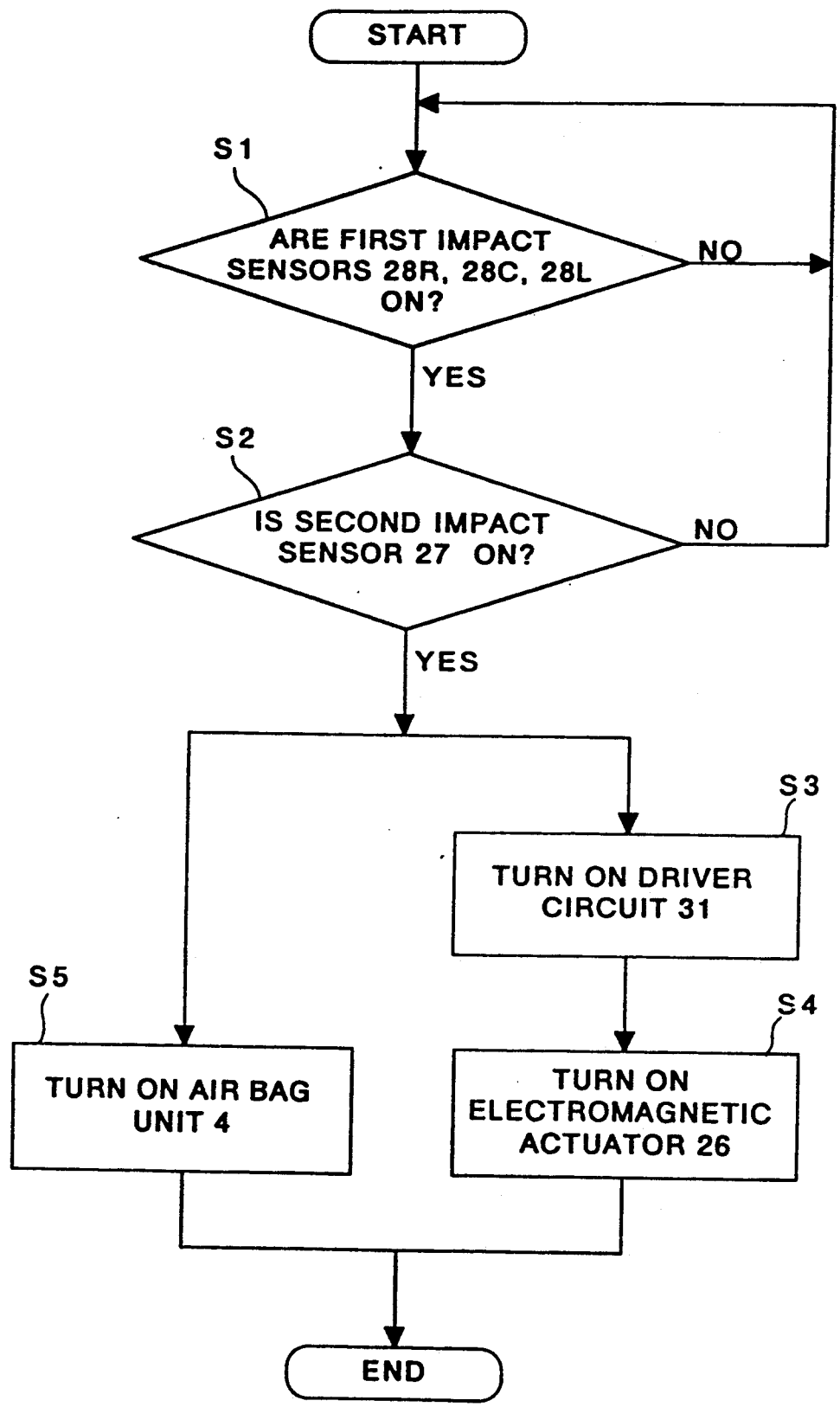
F I G. 15

APPARATUS FOR CONTROLLING ATTITUDE OF PASSENGER

BACKGROUND OF THE INVENTION

1. Field of the Invention

This invention relates to an apparatus for controlling the posture or attitude of a passenger, particularly the posture or attitude of a passenger in the compartment of a vehicle equipped with an air bag.

2. Description of the Prior Art

Various passenger cars equipped with an air bag as means for controlling the attitude of a passenger have been proposed in the art. For example, an apparatus for controlling the attitude of a passenger disclosed in Japanese Patent Application Laid-Open (KOKAI) No. 62-39740 is proposed to have an arrangement in which the passenger is protected by an air bag at the time of a collision. However, this arrangement does not have means for displacing the passenger downwardly when the collision occurs. Accordingly, though the hips of the passenger's torso are fixedly set on the seat of the vehicle in the foregoing proposal, if the passenger fails to fasten his or her seat belt, the passenger's head will not move downwardly toward the seat in the event of a collision of the type in which the front end of the vehicle body is caved in. Instead, there is the danger that the passenger's head will approach the front header above the air bag when a collision occurs..

Owing to design trends in recent years, which have resulted in vehicle bodies having a lower profile (i.e., less height), there is a much greater tendency for the head of a passenger to approach the front header above the air bag. This is an important problem in terms of safety, since a situation can arise in which the passenger's head will strike the front header or front windshield. In particular, since a steering wheel is not located in front of a passenger seated alongside the driver, the head of this passenger may strike the front header, windshield or the like directly.

SUMMARY OF THE INVENTION

Accordingly, an object of the present invention is to provide a passenger attitude control apparatus so adapted that a passenger on a seat is made to sink almost at the same time as operation of an air bag at the moment of a collision, thereby preventing the head of the passenger from approaching a front header above the air bag to preclude the occurrence of a situation in which the passenger's head strikes the front header, etc.

Another object of the present invention is to provide a passenger attitude control apparatus which makes it possible to deal with the lower profile of air bag-equipped vehicles that are the product of recent design trends.

According to the present invention, the foregoing object is attained by providing a passenger attitude control apparatus in which a compartment of a vehicle is equipped with an air bag so disposed as to restrain the upper body of a passenger when a collision occurs, comprising displacing means for displacing a cushioning support member, which supports a bottom portion of a seat, toward a lower side of a vehicle body substantially at the same time as operation of the air bag when a collision occurs, thereby moving the passenger downwardly, locking means for locking the displacing means in order to hold the support member at a normal usage position, and releasing means for releasing the locking of the displacing means by the locking means when the air bag operates, wherein the passenger is moved downwardly when the air bag operates, thereby distancing the passenger from a front portion of the compartment to prevent the passenger from striking the front portion. The safety of the passenger at the time of a collision can be assured even if the vehicle design is such that the compartment has a small height.

More particularly, in an apparatus for controlling the attitude of a passenger 3 in a vehicle equipped with an air bag 4 which restrains the upper body of the passenger 3 at the time of a collision, as shown in FIGS. 1 and 2, a cushion spring 15 of a retaining member disposed inside a seat 12 is displaced toward the lower side of the vehicle body substantially at the same time that the air bag 4 operates when the collision occurs, thereby lowering the hips of the passenger 3. In other words, at the same time that the air bag 4 operates, the cushion spring 15 inside the seat 12 is downwardly displaced. As a result, the hips of the passenger 3 are lowered so that the head of the passenger is distanced from a front header 9. This enhances passenger safety. Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is an operating flow chart of the second embodiment.

DESCRIPTION OF THE PREFERRED EMBODIMENTS

Preferred embodiments of the present invention will now be described with reference to the drawings. FIGS. 1 through 10 are views for describing a first embodiment of the passenger attitude control apparatus according to the present invention.

Figure 1:
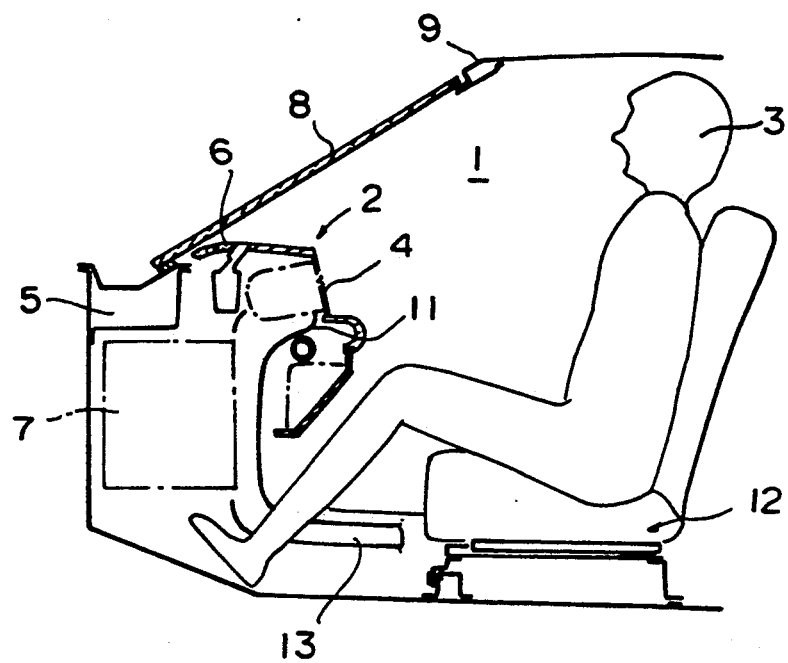
FIG. 1 is an explanatory view for describing a first embodiment of the present invention.
Figure 2:
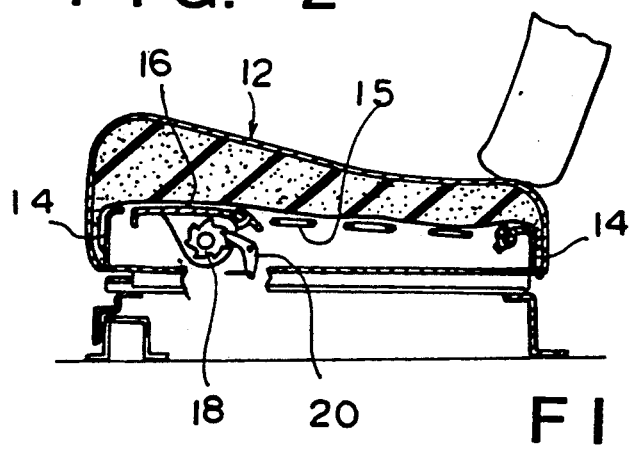
FIG. 2 is an explanatory view showing a principal portion of FIG. 1.

First, as shown in FIG. 1, an air bag unit 4 is provided inside an instrument panel 2 disposed in a passenger compartment 1 at the front end thereof. The air bag 4 is located at a position corresponding to that of a passenger 3. Numeral 5 denotes a cowl box, 6 a cowl cover, 7 an air conditioning unit, 8 a front windshield, and 9 a front header.

Figure 7:
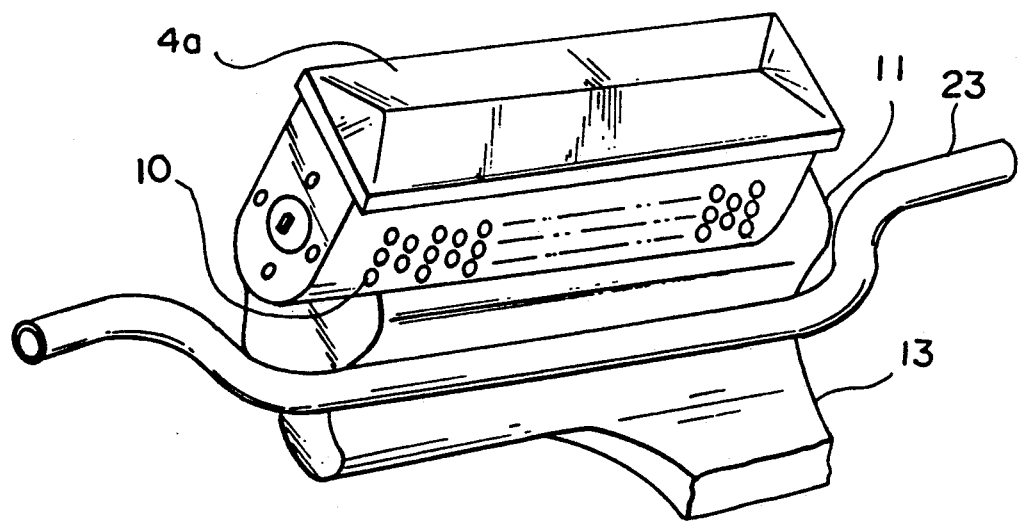
FIG. 7 is a perspective view showing the vicinity of an air bag case.

The air bag unit 4 is of the type which draws in outside air and, as shown in FIG. 7, includes an air bag case 4a both sides of which are provided with a number of air intake holes 10. A cover member 11 is disposed to cover the air bag case 4a and is connected to an air duct 13 extending to a seat 12.

As illustrated in FIGS. 2 through 5, a rotary plate 16 is disposed in the seat 12 on the front side thereof, a plurality of cushion springs 15 are disposed inside a seat frame 14, and each cushion spring 15 has an end portion 15a fixedly secured to the rotary plate 16. These components construct displacing means. The rotary plate 16 has a bracket 16a and is supported by a shaft 17 passed through a hole in the bracket 16a. One end portion of the shaft 17 is passed through a hole in the seat frame 14, and a ratchet gear 18 is attached to this end of the shaft protruding from the hole. An L-shaped Pawl 20 resiliently biased by a coil spring 19 is disposed on the outer side of the seat frame 14 so as to engage the ratchet gear 18. Locking means is thus constructed.

One end of a pull rod 21 is connected to an end portion of the Pawl 20 on a side thereof to be locked. The other end of the pull rod 21 is connected to a piston 22 accommodated within an end portion 13a of the air duct 13. Numeral 13b denotes the main body of the air duct. Numeral 23 in FIG. 7 denotes an instrument panel member.

Figure 6:
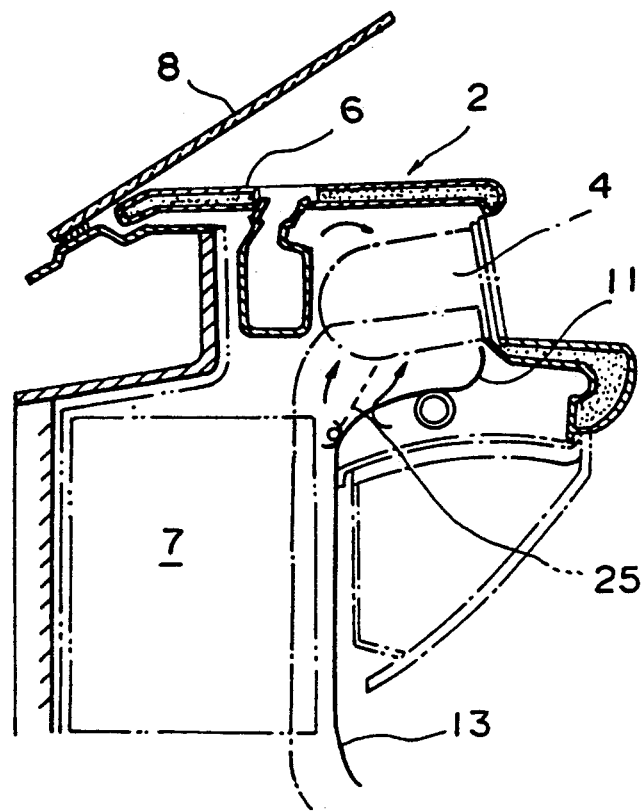
FIG. 6 is an enlarged view showing the vicinity of an instrument panel in FIG. 1.
Figure 8:
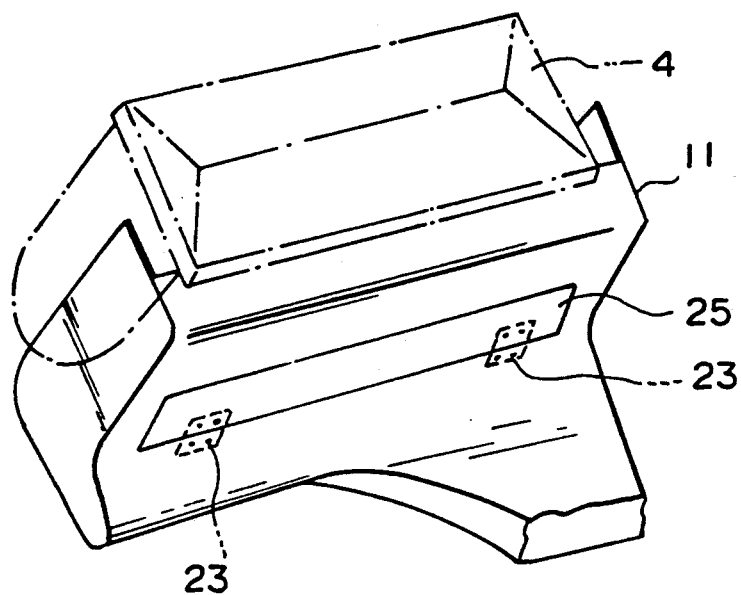
FIG. 8 is a perspective view showing the vicinity of an air bag unit.
Figure 9:
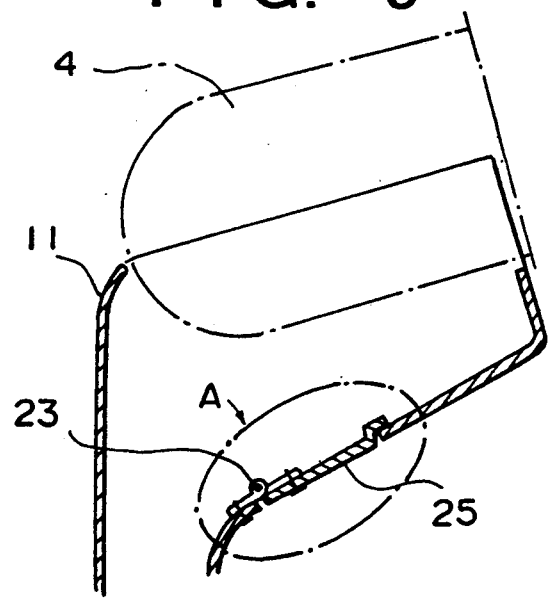
FIG. 9 is a sectional view of a cover member.
Figure 10:
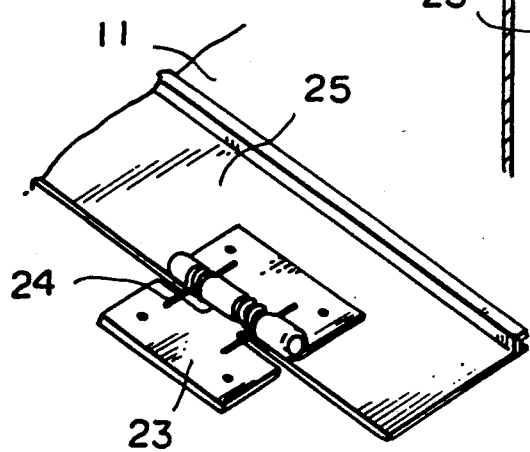
FIG. 10 is a perspective view of a portion A in FIG. 9.

As shown in FIG. 6, the cover member 11 of the air duct 13 is provided with a relief cover 25. As illustrated in FIGS. 8 through 10, the relief cover 25 is resiliently biased by springs 24, which are provided on hinges 23, so as to open by pressure greater than a predetermined pressure value.

Figure 3:
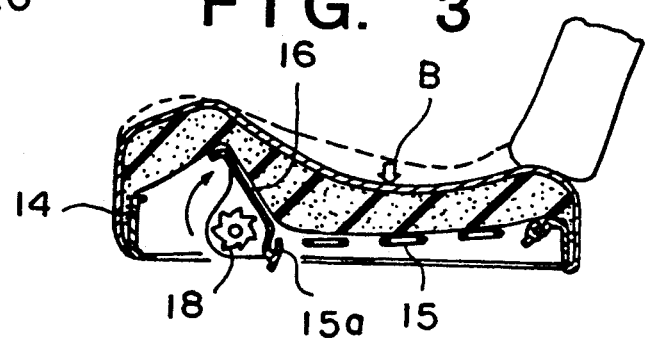
FIG. 3 is an explanatory view in which a portion of the arrangement of FIG. 2 has been displaced.
Figure 4:
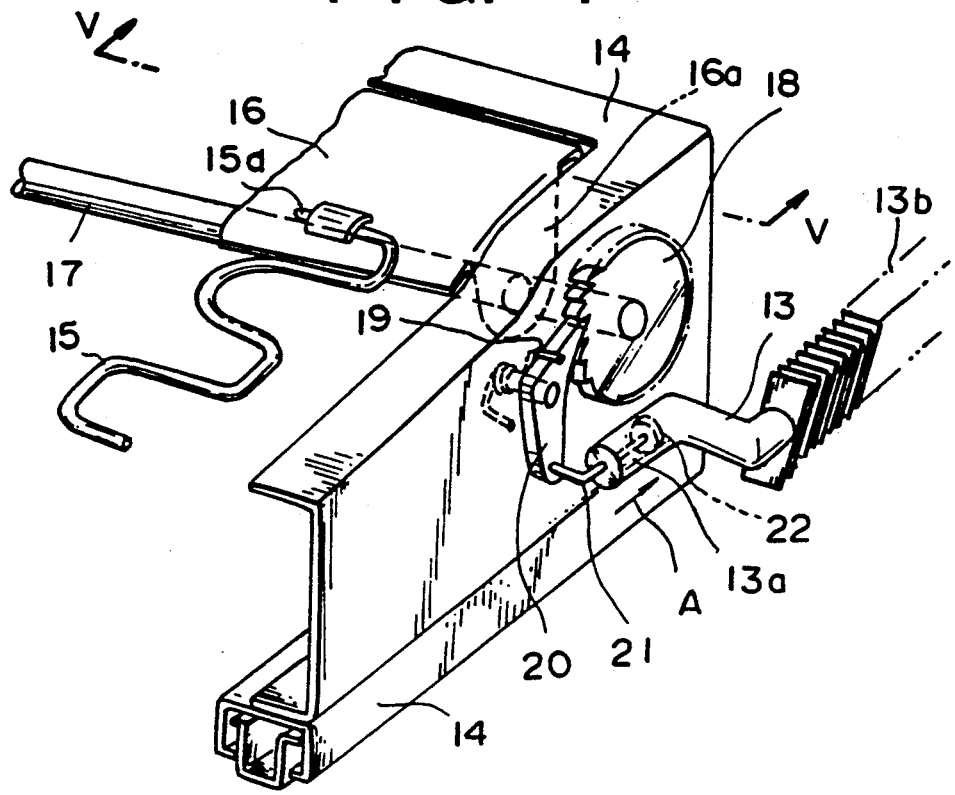
FIG. 4 is a perspective view showing the principal portion of FIG. 2 in greater detail.
Figure 5:
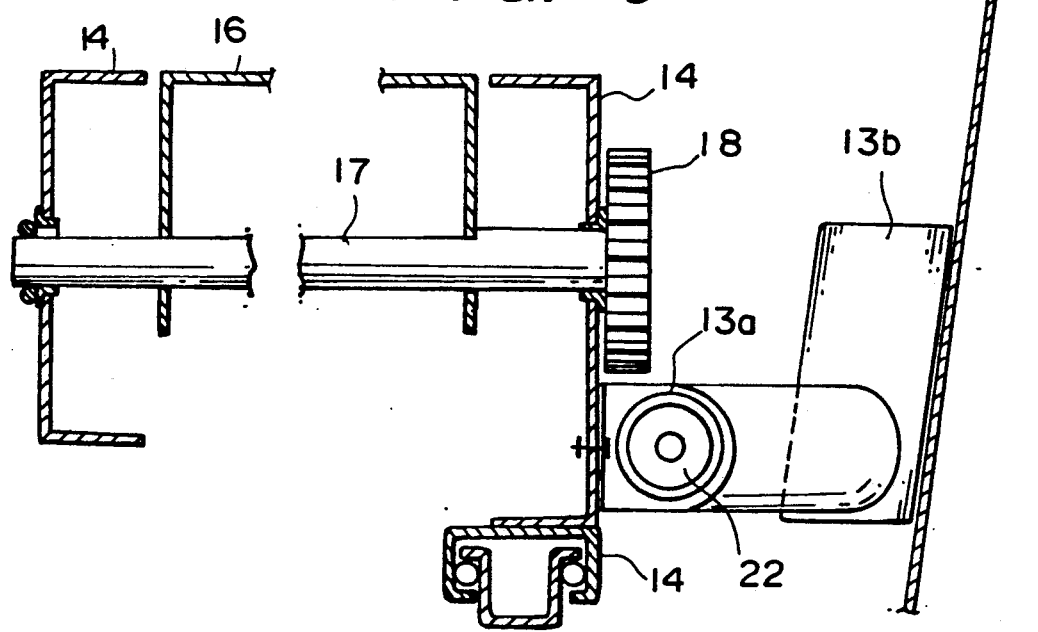
FIG. 5 is a sectional view taken along line V—V of FIG. 4.

Accordingly, when the air bag unit 4 expands owing to collision of the vehicle, a large amount of air is drawn in instantaneously from the air intake holes 10 since the bag is of the type which sucks in outside air. As a result, negative pressure inside the air duct 13 rises so that the piston 22 inside the end 13a of the duct is moved in the direction of arrow A along with the pull rod 21. Owing to this movement, the ratchet gear 18 is released from the locked state. Accordingly, as illustrated in FIG. 3, the rotary plate 16 is rotatively displaced from the state of ordinary use shown in FIG. 2, so that the end 15a of each cushion spring 15 is displaced toward the lower side of the vehicle body. The foregoing describes the action of releasing means.

As a result of the foregoing operation, the seat face of the seat 12, which occupies the position indicated by the dashed line in FIG. 3 prior to a collision, is lowered at substantially the same time as the occurrence of a collision to a position indicated by the solid line the height of which is shown by the arrow B. This causes the hips of the passenger 3 to be lowered. Accordingly, the head of the passenger 3 is distanced from the front header 9 when the collision occurs, thereby enhancing safety.

When the negative pressure inside the air duct 13 rises above a predetermined value after the air bag unit 4 expands and the seat face of the seat 12 sinks as described above, the relief cover 25 provided on the cover 11 opens against the force of the springs 24 of hinges 23, as shown in FIG. 6, as a result of which air is introduced from the interior of the passenger compartment.

Though the ratchet gear 18 is formed so that the entire circumference thereof has teeth which engage the Pawl 20, an arrangement can be adopted in which a tooth is formed at just one location on the circumference so that the Pawl 20 locks the ratchet gear 18 by engaging with this tooth. Further, if the strength of the locking means is insufficient, two Pawls 20 can be provided and made to lock both ends of the shaft 17.

In addition, rather than using the above-described wave-shaped machined articles as the cushion springs 15, these springs can be formed from coil springs or from a resin material capable of freely expanding and contracting.

Figure 11:
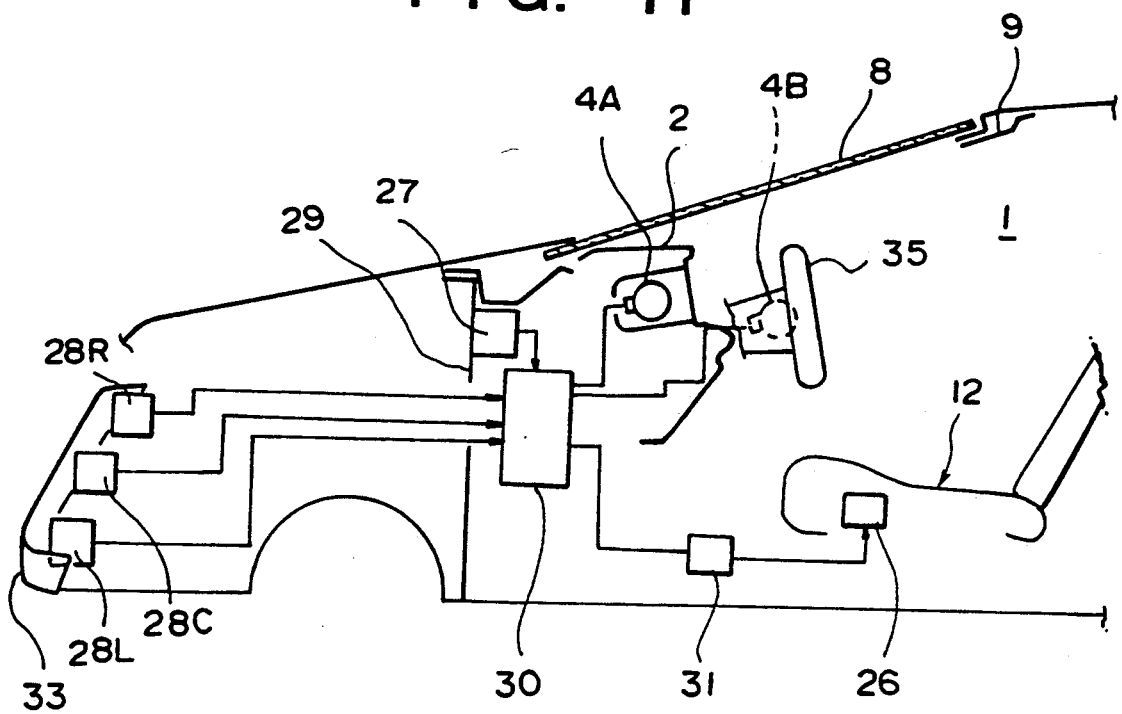
FIG. 11 is a block diagram showing a second embodiment of the invention.

A second embodiment of a passenger attitude control apparatus according to the present invention will now be described. In this embodiment, the locking means is actuated by an electromagnetic actuator constituting the releasing means. FIG. 11 is a block diagram of this embodiment, in which low-sensitivity first impact sensors 28L, 28C, 28R serving as impact sensors for sensing impact at the moment of a collision are provided at left, center and right positions, respectively, in the vicinity of a front bumper 33 located forwardly of passenger compartment 1. A high-sensitivity second impact sensor 27 is provided on a wall 29 partitioning the passenger compartment 1 from the engine room. The second impact sensor 27 and the three first impact sensors 28L, 28C, 28R are connected to a main control unit 30 comprising an electronic circuit such as an integrated circuit. Thus, the output signals from these sensors enter the main control unit 30.

Provided within the instrument panel 2, which is disposed at the front of the passenger compartment 1, is an air bag unit 4A situated at a position corresponding to that of the passenger alongside the driver. An air bag unit 4B is also provided inside a steering wheel 35 at a position corresponding to that of the driver in the driver's seat. These air bag units 4A, 4B are connected to the main control unit 30 and are started based upon control signals from the main control unit.

An electromagnetic actuator 26 is provided so as to release the seat 12, which internally accommodates the above-described displacing means and locking means, from the locked state established by the locking means. The actuator 26 is connected to the main control unit 30 via a driver circuit 31. A drive signal from the main control unit 30 is amplified by the driver circuit 31 in order to drive the actuator 26.

Figure 12:
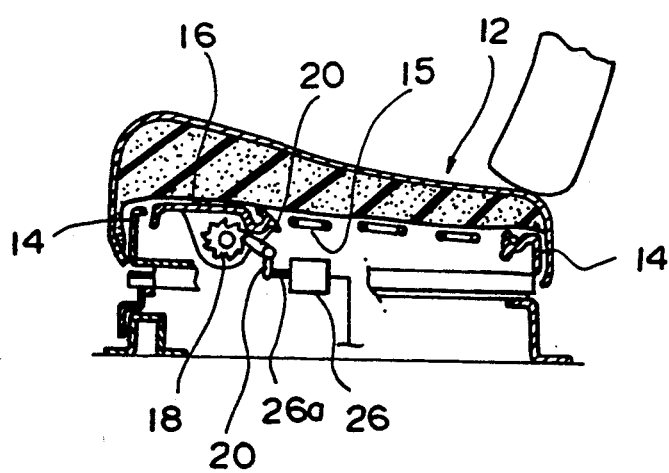
FIG. 12 is a sectional view showing a seat in FIG. 11.
Figure 13:
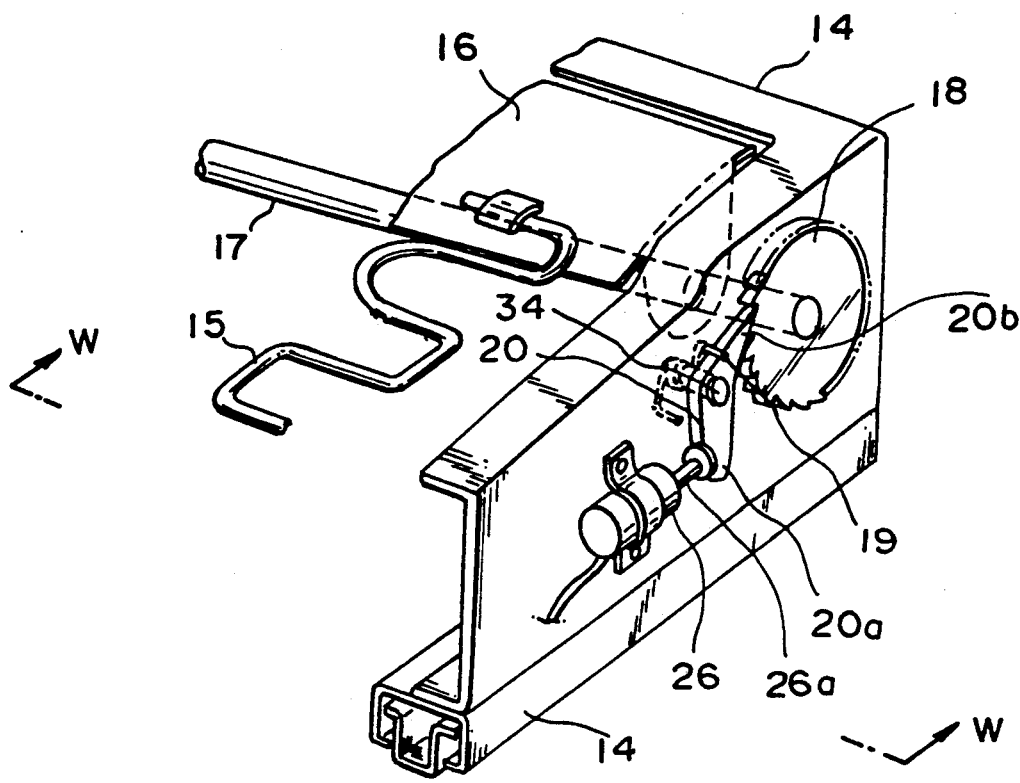
FIG. 13 is a perspective view showing a principal portion of the seat shown in FIG. 12.
Figure 14:
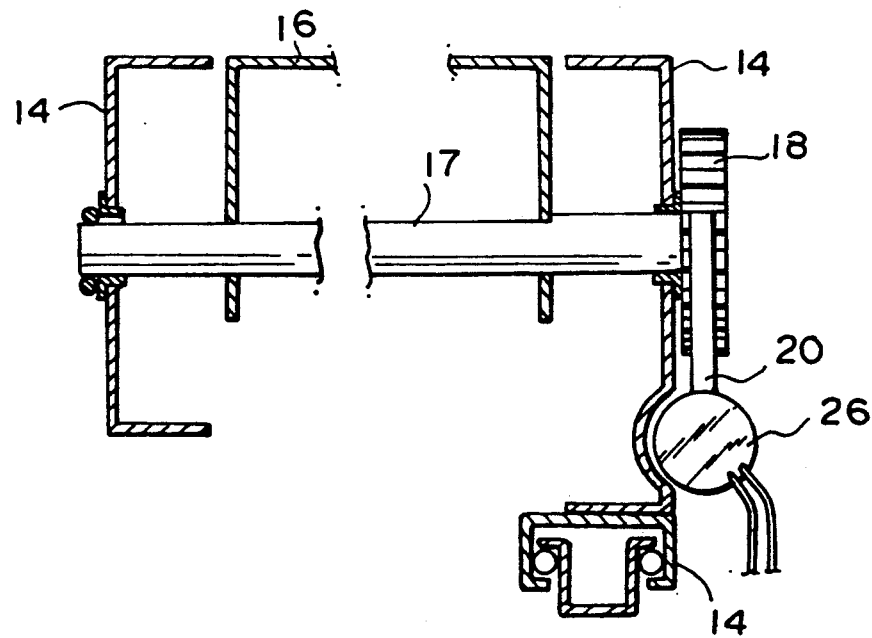
FIG. 14 is a sectional view taken along line W—W of FIG. 13.

As shown in FIGS. 12 through 14, the aforesaid displacing means and locking means are disposed inside the seat 12 at the lower part thereof, just as set forth above. Identical components are designated by like reference numerals and need not be described again. Only those components that differ from those of the first embodiment will be described.

The Pawl 20 is disposed to turn freely about a shaft 34 secured to the seat frame 14 in order that the Pawl 20 can be placed in a state in which it locks the ratchet gear 18 owing to the biasing force of a coil spring 19, and a state in which it releases the ratchet gear 18 from the locked state. The Pawl 20 has an arm with an upper end 20b capable of being held in an ordinarily used state by being engaged with the teeth of the ratchet gear 18. The electromagnetic actuator 26 has an actuator portion 26a driven by passage of an electric current so as to be thrust outward from the actuator 26. The actuator portion 26a is provided at a position where it is capable of pushing a lower end 20a of the arm of Pawl 20 when it is thrust outward from the actuator.

The operation of the second embodiment when a collision occurs will now be described with reference to the operation flowchart of FIG. 15. By way of example, the main control unit 30 is started in synchronism with turning of an engine key and then assumes a stand-by state. After the vehicle starts traveling, the program proceeds to step S1. When at least one of the low-sensitivity first impact sensors 28R, 28C, 28L senses an impact and turns on, the program proceeds to step S2. When none of these first impact sensors senses an impact, however, the program returns to step S1. It is determined at step S2 whether the high-sensitivity second impact sensor 27 provided on the dashboard has turned on. If the decision rendered at this step is YES, then this means that an impact force resulting from a collision has reached the dashboard, which is located near the passenger compartment, and it is decided that the passenger must be protected by operation of the air bag unit 4. Accordingly, the program proceeds to steps S3 and S5 substantially simultaneously. If the decision rendered at step S2 is that the second impact sensor 27 has not turned on, this means that the impact force resulting from a collision has not reached the passenger compartment since it has been sufficiently absorbed as by deformation of the front end of the vehicle body in addition to the front bumper 33. Therefore, it is decided that the passenger need not be protected by operation of the air bag unit 4, and the program returns to step S1.

Thus, the arrangement is such that the air bag unit 4 is actuated only when both the first and second impact sensors sense an impact, and actuation of the air bag unit 4 is prevented except when necessary. Though the first and second impact sensors each are separately connected to the main control unit 30 so that the processing is executed internally, an arrangement can be adopted in which these sensors are connected to the main control unit 30 via an AND gate. If such an arrangement is employed, the steps S1, S2 can be implemented by hardware, thereby simplifying the internal processing.

At step S3, the driver circuit 31 is turned on so as to receive and amplify the control signal from the main control unit 30. This is followed by step S4, at which the electromagnetic actuator 26 is turned on by sufficient power. As a result, the actuator portion 26a pushes the lower end 20a of the arm of actuator 20 shown in FIG. 13, thereby releasing the ratchet gear 18 from the locked state. Accordingly, the rotary plate 16 drops and rotates under the weight of the passenger so that the passenger is no longer held at the normal position by the cushion springs 15. This causes the passenger to sink into the seat. At step S5, which is executed approximately around the time of step S3 and S4, both of the air bag units 4A, 4B of FIG. 11 are turned on to rapidly inflate the air bags and restrain the upper bodies of the passengers.

Owing to the substantially simultaneous operations of steps S4 and S5 described above, the passenger is allowed to sink into the seat 12 while the upper body of the passenger is restrained by the air bag unit. Accordingly, the passenger's head is distanced from the front header 9 to enhance the passenger's safety. Since the air bag unit 4B provided inside the steering wheel is situated at a nearby position where it can restrain the upper body of the driver, there are also cases in which the displacing means and locking means need not always be provided inside the seat 12.

Thus, as described above, the hips of the passenger sink into the seat substantially at the same time that the air bag expands at the occurrence of a collision, thereby enhancing safety by lengthening the relative distance between the passenger and the front header. Since the arrangement of the invention allows the vehicle equipped with the invention to be provided with a lower profile, there is greater freedom in terms of vehicle design.

In each of the embodiments described above, displacing means is formed by the cushion springs and rotary plate, and locking means is formed by the ratchet gear and Pawl. Obviously, however, any construction can be adopted for these means so long as the passenger is caused to sink into the seat at the same time that the corresponding air bag is actuated.

In accordance with the present invention, as described above, it is so arranged that a passenger on a seat is caused to sink almost at the same time that an air bag is actuated at the occurrence of a collision, thereby preventing the head of the passenger from approaching a front header above the air bag to preclude the occurrence of a situation in which the passenger's head strikes the front header, etc.

Furthermore, it is it possible to deal with the lower profile of air bag-equipped vehicles that are the product of recent design trends.

As many apparently widely different embodiments of the present invention can be made without departing from the spirit and scope thereof, it is to be understood that the invention is not limited to the specific embodiments thereof except as defined in the appended claims.

What is claimed is:

1. A passenger attitude control apparatus in which a compartment of a vehicle is equipped with an air bag so disposed as to restrain the upper body of a passenger when a collision occurs, comprising:

a seat displacing means for displacing a cushioning support member which supports a bottom portion of said seat, toward a lower side of a vehicle body substantially at the same time as operation of the air bag when a collision occurs, thereby moving the passenger downwardly, said support member comprising a resilient wire material, and said displacing means comprising, one end of said support member fixed to a back side of said seat and the other end of said support member operatively coupled to a rotary plate freely rotatably supported at a front side of said seat;

locking means for locking said displacing means in order to hold said support member at a normal usage position; and releasing means for releasing the locking of said displacing means by said locking means when the air bag operates, wherein the passenger is moved downwardly when the air bag operates, thereby distancing the passenger from a front portion of the compartment to prevent the passenger from striking said front portion.

2. A passenger attitude control apparatus in which a compartment of a vehicle is equipped with an air bag so disposed as to restrain the upper body of a passenger when a collision occurs, comprising:

a seat, displacing means for displacing a cushioning support member, which supports a bottom portion of said seat, toward a lower side of a vehicle body substantially at the same time as operation of the air bag when a collision occurs, thereby moving the passenger downwardly;

locking means for locking said displacing means in order to hold said support member at a normal usage position; and releasing means which acts to release locking of said displacing means by negative pressure produced when said air bag is operated by intake of outside air, wherein the passenger is moved downwardly when the air bag operates, thereby distancing the passenger from a front portion of the compartment to prevent the passenger from striking said front portion.

3. A passenger attitude control apparatus in which a compartment of a vehicle is equipped with an air bag so disposed as to restrain the upper body of a passenger when a collision occurs, comprising:

a seat, displacing means for displacing a cushioning support member which supports a bottom portion of said seat, toward a lower side of a vehicle body substantially at the same time as operation of the air bag when a collision occurs, thereby moving the passenger downwardly;

locking means for locking said displacing means in order to hold said support member at a normal usage position comprising a portion to be locked provided on an end portion of a rotary shaft of a rotary plate;

a locking body supported on said seat for locking said portion to be locked; and releasing means which acts to release locking of said displacing means, when said air bag is operated, by an electromagnetic actuator which is actuated based upon a detection operation of impact sensors which sense impact when a collision occurs, wherein the passenger is moved downwardly when the air bag operates, thereby distancing the passenger from a front portion of the compartment to prevent the passenger from striking said front portion.

4. The apparatus according to claim 1, wherein said locking means comprises:

a portion to be locked provided on an end portion of a rotary shaft of said rotary plate; and a locking body supported on said seat for locking said portion to be locked.

5. The apparatus according to claim 1, wherein said releasing means acts to release locking of said displacing means by negative pressure produced when said air bag is operated by intake of outside air.

6. The apparatus according to claim 5, wherein said seat is a passenger seat, and an air bag of a type which draws in outside air is disposed at a forward part of the compartment.

7. The apparatus according to claim 1, wherein said releasing means acts to release locking of said displacing means, when said air bag is operated, by an electromagnetic actuator which is actuated based upon a detection operation of impact sensors which sense impact when a collision occurs.

8. The apparatus according to claim 7, wherein said seat is a driver seat, and said air bag is disposed inside a steering wheel.

9. The apparatus according to claim 7, wherein said seat is a driver seat and a passenger seat, and said air bag is disposed inside a steering wheel and in a forward part of the compartment.

10. The apparatus according to claim 7, wherein said impact sensors are constructed by connecting a plurality of low-sensitivity first impact sensors provided near a front bumper and a high-sensitivity second impact sensor provided on a front wall in front of the passenger compartment;

said detection operation being performed only when both of at least one of said first impact sensors and said second impact sensor operate.

11. The apparatus according to claim 1, wherein said locking means comprises:

a portion to be locked provided on an end portion of a rotary shaft of said rotary plate; and a locking body supported on said seat for locking said portion to be locked.

12. The apparatus according to claim 1, wherein said seat is a passenger seat, and an air bag of a type which draws in outside air is disposed at a forward part of the compartment.

13. The apparatus according to claim 1, wherein said seat is a driver seat and said air bag is disposed inside a steering wheel.

14. The apparatus according to claim 1, wherein said seat is a driver seat and a passenger seat, and said air bag is disposed inside a steering wheel and in a forward part of the compartment.

15. The apparatus according to claim 2, wherein said seat is a passenger seat, and an air bag of a type which draws in outside air is disposed at a forward part of the compartment.

16. The apparatus according to claim 3, wherein said seat is a driver seat, and said air bag is disposed inside a steering wheel.

17. The apparatus according to claim 3, wherein said seat is a driver seat and a passenger seat, and said air bag is disposed inside a steering wheel and in a forward part of the compartment.

18. The apparatus according to claim 3, wherein said impact sensors are constructed by connecting a plurality of low-sensitivity first impact sensors provided near a front bumper and a high-sensitivity second impact sensor provided on a front dashboard;

said detection operation being performed only when at least one of said first impact sensors and said second impact sensor operate.

19. The apparatus according to claim 3, wherein said impact sensors are constructed by connecting a plurality of low-sensitivity first impact sensors provided near a front bumper and a high-sensitivity second impact sensor provided on a front wall in front of the passenger compartment;

said detection operation being performed only when both of at least one of said first impact sensors and said second impact sensor operate.

* * * * *

UNITED STATES PATENT AND TRADEMARK OFFICE
CERTIFICATE OF CORRECTION

PATENT NO. :  5,125,472
DATED       :  June 30, 1992
INVENTOR(S) :  Toshihiro Hara It is certified that error appears in the above-identified patent and that said Letters Patent is hereby corrected as shown below:

Column 1, line 17:
"62-39740" should be --62-139,740--

Signed and Sealed this

Thirtieth Day of November, 1993

Attest:

BRUCE LEHMAN

Attesting Officer

Commissioner of Patents and Trademarks